(12) United States Patent  (10) Patent No.: US 8,538,176 B2
Closset et al.  (45) Date of Patent: Sep. 17, 2013

(54) METHOD FOR SENDING COMPRESSED DATA REPRESENTING A DIGITAL IMAGE AND CORRESPONDING DEVICE

(75) Inventors: Arnaud Closset, Cesson-Sevigne (FR); Laurent Frouin, Rennes (FR); Patrice Onno, Rennes (FR)

(73) Assignee: Canon Kabushiki Kaisha, Tokyo (JP)

( * ) Notice: Subject to any disclaimer, the term of this patent is extended or adjusted under 35 U.S.C. 154(b) by 378 days.

(21) Appl. No.: 12/852,699

(22) Filed: Aug. 9, 2010

(65) Prior Publication Data

US 2011/0038557 A1  Feb. 17, 2011

(30) Foreign Application Priority Data

Aug. 7, 2009  (EP) ..................................... 09305745

(51) Int. Cl.
*H04N 7/50* (2006.01)
(52) U.S. Cl.
USPC ........................... 382/232; 382/239; 382/251
(58) Field of Classification Search
USPC ........ 382/232, 239, 251; 235/492; 340/10.1; 341/51, 94; 714/788, 781, 752; 375/240.04, 375/E7.134
See application file for complete search history.

(56) References Cited

U.S. PATENT DOCUMENTS

| | | | |
|---|---|---|---|
| 6,501,860 B1 | 12/2002 | Charrier et al. | 382/240 |
| 6,891,895 B1 | 5/2005 | Onno et al. | 375/260 |
| 6,937,653 B2 | 8/2005 | Song et al. | 375/240.03 |
| 7,050,495 B2 * | 5/2006 | Mihara et al. | 375/240.04 |
| 7,113,643 B2 | 9/2006 | Le Leannec et al. | 382/235 |
| 7,190,838 B2 | 3/2007 | Le Leannec et al. | 382/233 |
| 7,212,678 B2 | 5/2007 | Brown et a | 382/240 |
| 7,215,819 B2 | 5/2007 | Onno et al. | 382/240 |
| 7,256,717 B2 | 8/2007 | Piret et al. | 341/58 |
| 7,260,264 B2 | 8/2007 | Guillou et al. | 382/232 |
| 7,281,033 B2 | 10/2007 | Le Leannec et al. | 709/217 |
| 7,315,262 B2 | 1/2008 | Walker et al. | 341/58 |
| 7,382,923 B2 | 6/2008 | Onno | 382/233 |
| 7,499,546 B2 | 3/2009 | Donescu et al. | 380/217 |
| 7,571,316 B2 | 8/2009 | Onno et al. | 713/160 |
| 7,580,578 B1 | 8/2009 | Onno et al. | 382/232 |
| 7,746,332 B2 | 6/2010 | Le Leannec et al. | 345/204 |
| 2004/0068587 A1 | 4/2004 | Le Leannec et al. | 709/247 |
| 2004/0076229 A1 | 4/2004 | Ishikawa | 375/240.01 |
| 2004/0190609 A1 | 9/2004 | Watanabe | 375/240.03 |
| 2004/0247187 A1 | 12/2004 | Tanaka et al. | 382/232 |
| 2007/0019721 A1 | 1/2007 | Le Leannec et al. | 375/240.1 |
| 2007/0223033 A1 | 9/2007 | Onno et al. | 358/1.15 |
| 2008/0075170 A1 | 3/2008 | Henocq et al. | 375/240.16 |
| 2008/0095231 A1 | 4/2008 | Onno et al. | 375/240.12 |
| 2008/0130736 A1 | 6/2008 | Onno et al. | 375/240.01 |
| 2008/0131011 A1 | 6/2008 | Le Leannec et al. | 382/238 |

(Continued)

OTHER PUBLICATIONS

Wiegand, T., et al., "Overview of the H.264/AVC Video Coding Standard", IEEE Transactions on Circuits and Systems for Video Technology, vol. 13, No. 7, Jul. 1, 2003, pp. 560-576.

*Primary Examiner* — Anh Do
(74) *Attorney, Agent, or Firm* — Fitzpatrick, Cella, Harper & Scinto

(57) ABSTRACT

A method for sending compressed data representing at least part of a digital image includes the following steps:
encoding (220) source data representing said part to obtain first compressed data having a given size;
based at least on said size, including (210) said first compressed data either in a first slice comprising second compressed data representing other parts of the digital image or in an empty second slice;
sending the slice comprising said first compressed data.
A corresponding device is also described.

17 Claims, 10 Drawing Sheets

(56) References Cited

U.S. PATENT DOCUMENTS

| | | | |
|---|---|---|---|
| 2009/0037789 A1 | 2/2009 | Frouin et al. | 714/752 |
| 2009/0278956 A1 | 11/2009 | Le Leannec et al. | 348/222.1 |
| 2009/0290648 A1 | 11/2009 | Onno et al. | 375/240.27 |
| 2009/0310674 A1 | 12/2009 | Le Leannec et al. | 375/240.12 |
| 2010/0142622 A1 | 6/2010 | Le Leannec et al. | 375/240.16 |
| 2010/0296000 A1 | 11/2010 | Henocq et al. | 348/723 |

\* cited by examiner

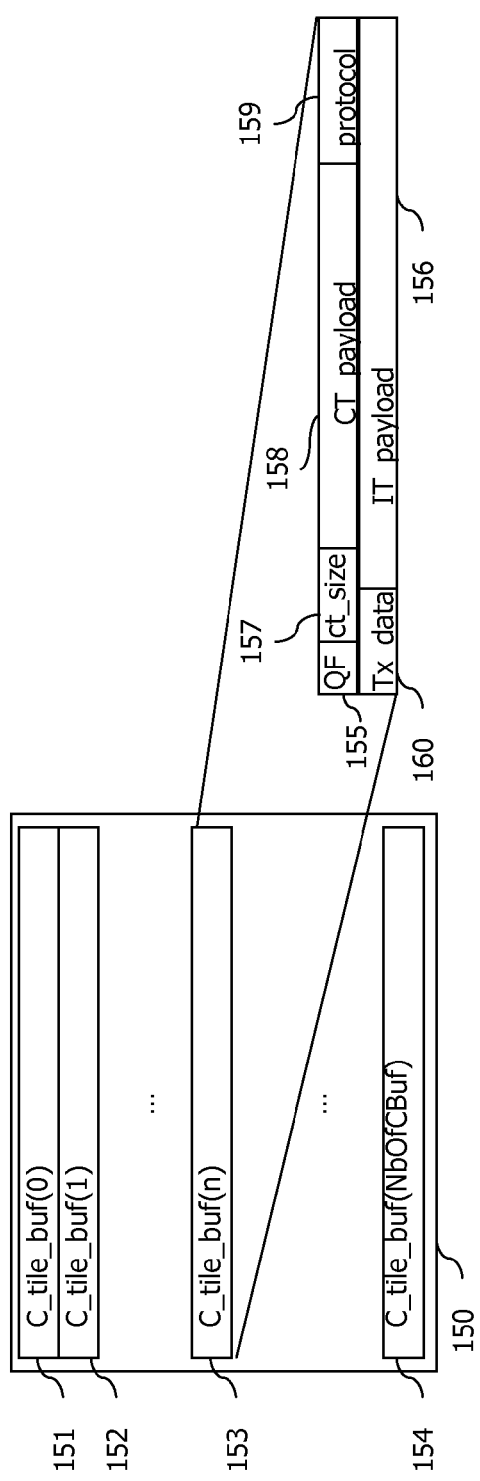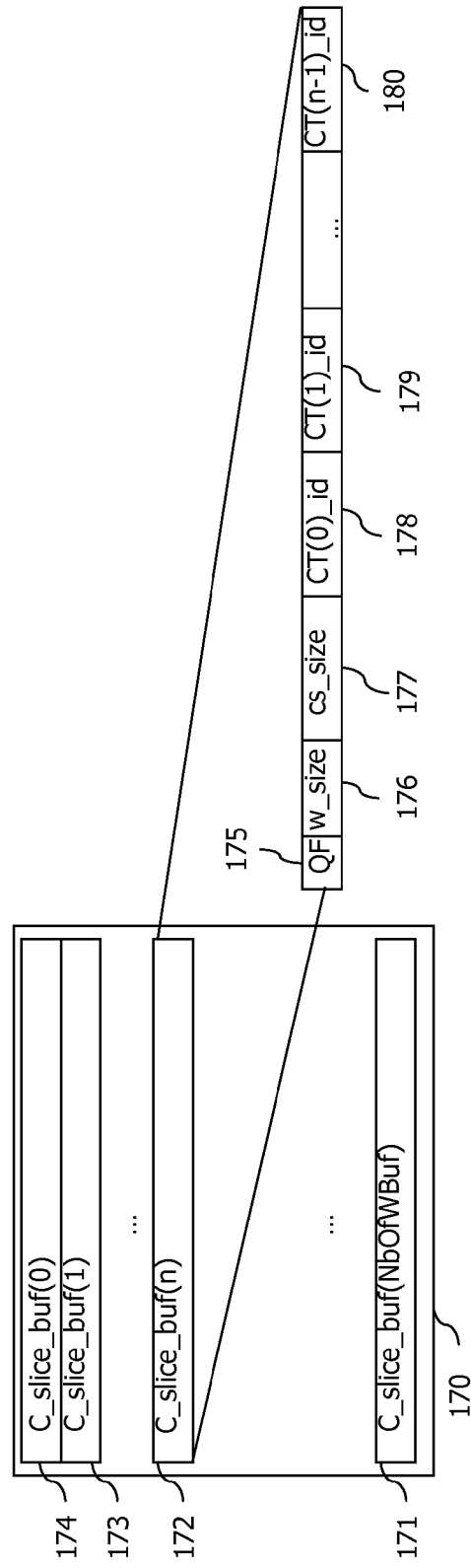

METHOD FOR SENDING COMPRESSED DATA REPRESENTING A DIGITAL IMAGE AND CORRESPONDING DEVICE

This application claims priority from European patent application No. 09305745 of Aug. 7, 2009, which is incorporated herein by reference.

FIELD OF THE INVENTION

The invention relates to a method of sending compressed data representing a digital image and to a corresponding device.

BACKGROUND OF THE INVENTION

In video transmission over digital networks, various applications (in a broad area ranging from video conferencing to digital home theatre systems) require a sufficient level of responsiveness (i.e. low latency).

Conventional solutions have focused on reducing the transmission time (mainly by transmitting compressed data representing the video) and by trying to make this transmission time more predictable, for instance despite the variable amount of compressed data to be transmitted depending on the complexity of the images forming the video, and taking into account the limitations of the transmission channel.

A conventional solution to absorb jitter is to insert buffers (usually called "leaky buckets") at various points on the video processing chain where congestion is expected, basically at the level of the encoder output and at the level of the transmission channel.

The use of buffers however tends to increase latency, which moreover remains unpredictable as it depends on network conditions and on image complexity.

This problem has been addressed in U.S. Pat. No. 6,937,653 by monitoring buffer occupancy and controlling it by either padding (i.e. filling with unused data) or deleting data in excess, which however significantly decreases the quality.

SUMMARY OF THE INVENTION

In this context, the invention provides a method for sending compressed data representing at least part of a digital image, wherein the following steps are performed:
- encoding source data representing said part to obtain first compressed data having a given size and a first complexity;
- including said first compressed data either in a first slice comprising second compressed data representing other parts of the digital image and having a second complexity, or in an empty second slice, depending on at least said first complexity and said second complexity;
- sending the slice comprising said first compressed data.

In practice, the decision to include the first compressed data either in the first slice or in the second slice may also be based on the given size.

The transmission is thus performed by slices (or windows) transporting data representing a variable number of parts of the image, depending on the size and complexity of the corresponding compressed data, and the volume of the slices is consequently adapted without however reducing the quality of the image transmitted.

Said source data may be coded according to a coding parameter (representing e.g. a quantization step) adapted to influence said size and determined depending on a volume of said second compressed data. Encoding of the source data is thus adapted so that the size of the first compressed data better corresponds to the remaining size within the slice (i.e. the total size of the slice minus said volume).

According to the embodiment described later, said coding parameter is a quantization parameter and is determined (e.g. is set to a predetermined value, to a value lower than said predetermined value or to a value larger than said predetermined value) depending on a size of said second compressed data compared to a predetermined average size associated with said other parts. This provides a practical way for controlling the coding parameter with the goal that the compressed data relating to an expected remaining number of parts (in connection with the predetermined average size) will fit within the slice.

According to a possible variation, said coding parameter is modified, compared to a value used for said parameter when encoding a previous part among said other parts, based on the difference between a slice budget and the sum of said volume and an expected volume for the expected remaining number of parts in the slice. This provides another practical way for controlling the coding parameter with the goal that the compressed data relating to the expected remaining number of parts will fit within the slice.

If the first compressed data are included in an empty second slice, the first slice may be completed by padding data. Padding data is thus spread over the transmitted stream formed by the slices, so that the total number of padding data is reduced thanks to the optimal association of parts of the digital image to slices in order to reach an average throughput for the compressed data.

In this embodiment, said coding parameter is for instance a quantization parameter (which may represent as noted above a quantization step) and said coding parameter may then be increased if said sum is greater than said slice budget.

Including either in the first slice or in the second slice may also be based on a predetermined maximum number of represented parts per slice. It may thus be provided that the number of image parts within the slice does not exceed this predetermined maximum number, even if the second compressed data are not particularly voluminous.

Said first compressed data is for instance included in said second slice if the size of the first compressed data and second compressed data exceeds a predetermined maximum slice size, which is a convenient solution to ensure that slices remain of acceptable size.

Said first compressed data may also be included either in the first slice or in the second slice further depending on an amount of compressed data representing at least one part among said other parts. In this embodiment, inclusion is not only based on the image part represented by first compressed data.

Said first compressed data may also be included either in the first slice or in the second slice further depending on a quantization value used for encoding said source data. This quantization value together with the size of the first compressed data may help defining a criterion representative of the complexity of the image part, as explained with respect to the detailed embodiment described hereinafter.

Said first compressed data may also be included either in the first slice or in the second slice further depending on a quality of representation of said source data by said compressed data. As just noted with respect to quantization value, use of the quality together with the size of the first compressed data may help defining another criterion representative of the complexity of the image part.

As explained in the embodiment described, first compressed data may be encoded according to a first level encoding pass enabling said first compressed data to be obtained within a determined time period, and the sending method may then also comprise a second encoding step for generating third compressed data representing said part according to at least one second level encoding pass, and the third compressed data may be selected instead of the first compressed data for being included in the including step, on at least one condition, comprising that the third compressed data is obtained within the determined time period. The concerned data may therefore be further processed (e.g. to improve quality or compression) within a given transmission timeframe, thus optimizing the bandwidth consumption.

Depending on at least a size of said third compressed data, a further image part may be included either in the first slice or in the second slice. Slices may thus be re-arranged when another representation (third compressed data) of the image part is produced in order to adapt to this new representation, thus optimizing association of parts within the digital image when encoded according to a second level pass is performed.

The invention also provides a device for sending compressed data representing at least part of a digital image, characterised by:
- means for encoding source data representing said part into first compressed data having a given size;
- means for including, based at least on said size, said first compressed data either in a first slice comprising second compressed data representing other parts of the digital image or in an empty second slice;
- means for sending the slice comprising said first compressed data.

Optional features mentioned above with respect to the sending method may also apply to this sending device.

The invention further provides a computer program comprising instructions for carrying out each step of the method described above when the program is loaded and executed by a programmable apparatus.

The invention also provides an information storage means readable by a computer or a microprocessor storing computer program instructions for carrying out each step of the method described above when the program is loaded and executed by a programmable apparatus.

BRIEF DESCRIPTION OF THE DRAWINGS

Other features and advantages of the invention will appear in light of the following description made with reference to the appended drawings, in which:

FIG. 3 shows a possible example of memory organization for tile definition storage;

FIG. 4 shows a possible example of memory organization for slice definition storage;

DETAILED DESCRIPTION OF EMBODIMENTS OF THE INVENTION

Figure 1:
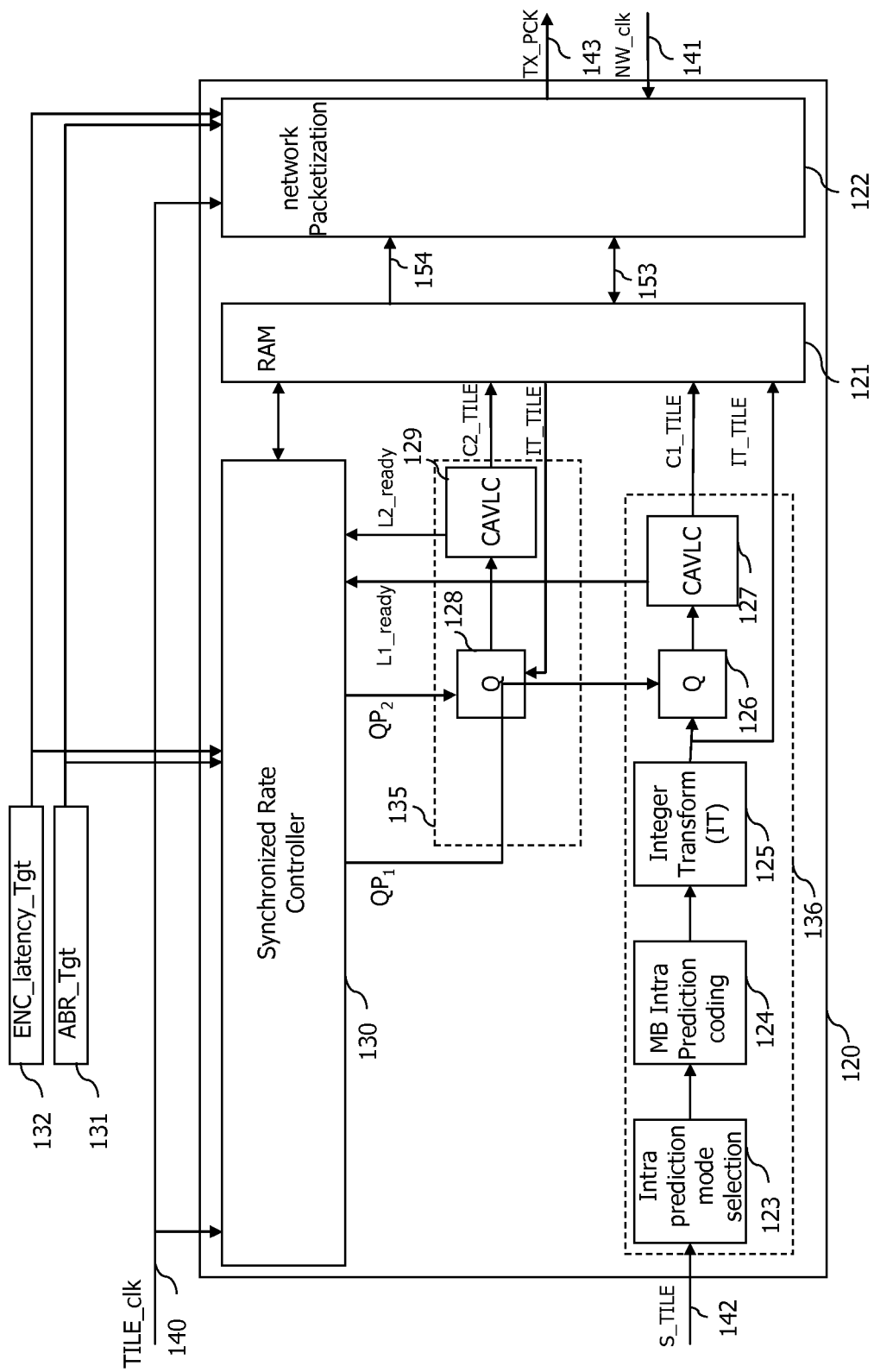
FIG. 1 shows an example of a video frame encoder designed in accordance with the teachings of the invention.

FIG. 1 illustrates the main elements of an image encoder 120 adapted to implement an encoding method according to the invention.

Encoder 120 receives from a video interface module (shown in FIG. 2 under reference 104) a tile clock signal TILE_clk as well as source video tile information S_TILE.

Source video tile information S_TILE describes all consecutive pixels for a predefined number of consecutive lines of the image forming a tile. Each pixel is encoded for instance using the YUV colour space coding format. In the present example, a tile is made of 16 video lines. For instance in the case of a 1080p video source, a video line is composed of 1920 pixels of 24 bits each using the YUV encoding format. The corresponding source video tile information is 16*24*1920 bits for a 16-line tile.

The tile clock signal TILE_clk provides accurate timing identifying the first pixel of each tile within the overall video stream timeline. For instance in case of a 1080p video source, each video frame contains 1080 lines and 60 video frames are provided per second. In this case, the corresponding tile clock period is thus $(1/60)*(1/1080)*16$ seconds (246.91 microseconds) for a 16-line tile. The video stream timeline is usually driven by the video source.

The encoder 120 also receives a network clock signal NW_clk from a network interface module (shown by reference 106 in FIG. 2 described later). As explained in further detail below, the encoder 120 is designed to transmit to the network interface module a data packet TX_PCK having a predetermined size at a regular cadence determined by the network clock signal NW_clk (i.e. generally in accordance with the network clock signal NW_clk period, e.g. every 125 microseconds).

These fixed size data packets TX_PCK can then be transmitted by the network interface module 106, possibly with additional data buffering when variations on the network are to be compensated for. Transmission over a synchronous network without further buffering would however be optimally beneficial to the encoding method provided by the encoder of FIG. 1.

A description will now be given of the various blocks forming the encoder 120 shown in FIG. 1.

The encoder 120 comprises a first level encoder 136 enabling the source information S_TILE to be encoded thanks to a first level encoding pass, the first level encoding pass corresponding to a first encoding path.

In the present example, the first level encoder 136 encodes the source information data according to the H264 standard using H264 intra-coding only (i.e. without motion prediction). Other types of coding could of course be used instead.

As shown in FIG. 1, source data representing a tile S_TILE are first processed through a prediction mode selection module 123 which analyses source data S_TILE for selection of the intra prediction mode to be used.

Source data S_TILE are then processed by a prediction coding module 124 where the macro blocks (MB) forming the tile (i.e. 16*16 pixel blocks within the tile) are processed according to the prediction mode determined in the prediction mode selection module 123.

For each macro block, the residual data obtained by comparing the predicted macro block to the original macro block (i.e. the macro block in the source data S_TILE) are then processed through an integer transform module 125, thus generating an integer transform intermediate result. The set of integer transform intermediate results obtained for the various macro blocks of the tile being processed, referenced as IT_TILE, is stored temporarily in an internal memory 121 of the encoder 120 as shown in FIG. 1.

A quantization module 126 then applies a quantization step to the coefficients of the set IT_TILE with quantization parameters $QP_1$ defined by the synchronized rate control module 130 as further explained below.

Quantized coefficients, possibly reordered, are then processed by a CAVLC module 127 (CAVLC standing for "Context Adaptive Variable Length Coding"), thus performing entropy encoding and obtaining compressed data C1_TILE representing the tile. The CAVLC module 127 stores the compressed data C1_TILE representing the tile in memory 121 and simultaneously generates a signal referenced L1_ready for the synchronized rate control module 130, as shown in FIG. 1.

The encoder 120 further comprises a second level encoder 135 enabling the source data S_TILE to be coded using a second level encoding pass which corresponds to an encoding according to a second encoding path.

As further explained below, operation of second level encoder 135 is triggered by the synchronized rate control module 130, based on criteria detailed below, among which is the possibility to perform at least one second level encoding before the expected transmission time for compressed data representing the source video tile S_TILE concerned.

In the preferred embodiment as further described hereafter, one second level encoding pass is possibly performed for a given tile. In an alternative embodiment, more than one pass of second level encoding is performed for a given tile, as a function of the remaining time before transmission of the tile.

In the present embodiment, the second level encoder 135 comprises a quantization module 128 for quantizing coefficients of the set IT_TILE obtained by the first level encoder 136 and then stored in memory 121 as previously explained. The quantization parameters $QP_2$ used in the quantization module 128 are however different from the quantization parameters $QP_1$ used in the quantization module 126, with the general aim of improving the quality of the representation of the source information S_TILE compared to the quality obtained by representing the source information S_TILE by the compressed data C1_TILE obtained by the first level encoder 136.

The quantization parameters $QP_2$ used in the quantization module 128 are determined by the synchronized rate control module 130 as explained below.

The quantized coefficients output from the quantization module 128 are then reordered and processed through the CAVLC module 129 performing entropy encoding (in a similar manner to that by the CAVLC module 128).

The CAVLC module 129 stores the resulting compressed data C2_TILE in the memory 121 and simultaneously generates a signal referenced L2_ready transmitted to the synchronized rate control module 130.

As explained above, the second level encoder 135 of the described embodiment uses intermediate results computed by the first level encoder 136. According to alternative embodiments, the second level encoder 135 could compute compressed data C2_TILE directly from the source video information S_TILE.

It can also be pointed out that, although the various steps of encoding are shown as being made by various modules, a single physical module could perform several of these steps. In particular, the quantization corresponding to the first level encoding pass (referring to the module 126 in FIG. 1) and the quantization corresponding to the second level encoding pass (referring to the module 128 in FIG. 1) could be implemented by the same quantization module. Similarly, the entropy encoding of the first level encoding pass and of the second level encoding pass could be implemented by a single CAVLC module.

As previously noted, the encoder 120 includes an internal memory (generally a RAM) 121 comprising:

- a buffering bank, containing the compressed tile data obtained by the CAVLC modules 127, 129, as well as the intermediate results obtained by the integer transform module 125, and internally organized as a circular buffer for example; typically, the buffering bank contains the payload data CT_payload 158 and IT_payload 156 referenced in the buffers C_TILE 151 to 154 as further described below with reference to FIG. 3; and

- a configuration bank, containing all necessary tile and slice parameters (such as the banks of buffers C_TILE 150 and C_SLICE 170 as shown in FIGS. 3 and 4) obtained by the synchronous rate control module 130 during slice formatting, and arranged as configuration registers for example. Those parameters are further used by the network packetization module 122 to perform padding insertion as explained later.

The encoder 120 comprises as already mentioned the synchronized rate control module 130.

The synchronized rate control module 130 receives the tile clock signal TILE_clk from the video interface module 104 and the signals L1_ready, L2_ready respectively from the first level encoder 136 and the second level encoder 135.

The synchronized rate control module determines, as already noted and further detailed below, the quantization parameters $QP_1$, $QP_2$ respectively used in the quantization modules 126, 128 of the first level encoder 136 and the second level encoder 135.

As further described below, the rate control module 130 also checks whether replacement of the compressed data C1_TILE with the compressed data C2_TILE would not overload the considered slice. As a possible variation, the rate control module 130 could check whether there is any compression improvement from the compressed data C1_TILE to the compressed data C2_TILE.

As also described in detail below, the synchronized rate control module 130 performs the task of managing the aggregation of compressed tiles. For this purpose, the tile structure parameters (e.g. payload size and a quality parameter or factor) and the updated slice structure parameters (size, aggregated payload size, tile addresses in the buffering bank and the mean quality factor of associated tiles) are stored in the configuration bank, once the tile compression is ended, i.e. upon occurrence of event L1_ready.

The encoder 120 lastly comprises a network packetization module adapted to prepare fixed-size packets TX_PCK based on compressed data stored in the memory 121 and to deliver them in a timely manner to the network interface module 106.

The network packetization module 122 thus has the task of delivering network packets, consisting in formatting Network Data Units (NDUs) with previously buffered compressed data payload, and appending blank data (i.e. padding) at the end of each slice, so as to attain the corresponding typical payload size, depending on:
- the actual payload size of the considered slice,
- the typical predefined payload size of the considered slice, based on the number of tiles in the slice and the number of NDUs allocated for one tile.

The compressed data are retrieved from the memory 121 through the data interface 153 (from the buffering bank), while all necessary parameters necessary to delimit the tiles, such as the size parameters, are retrieved from the parameter interface 154 (from the configuration bank).

Figure 10:
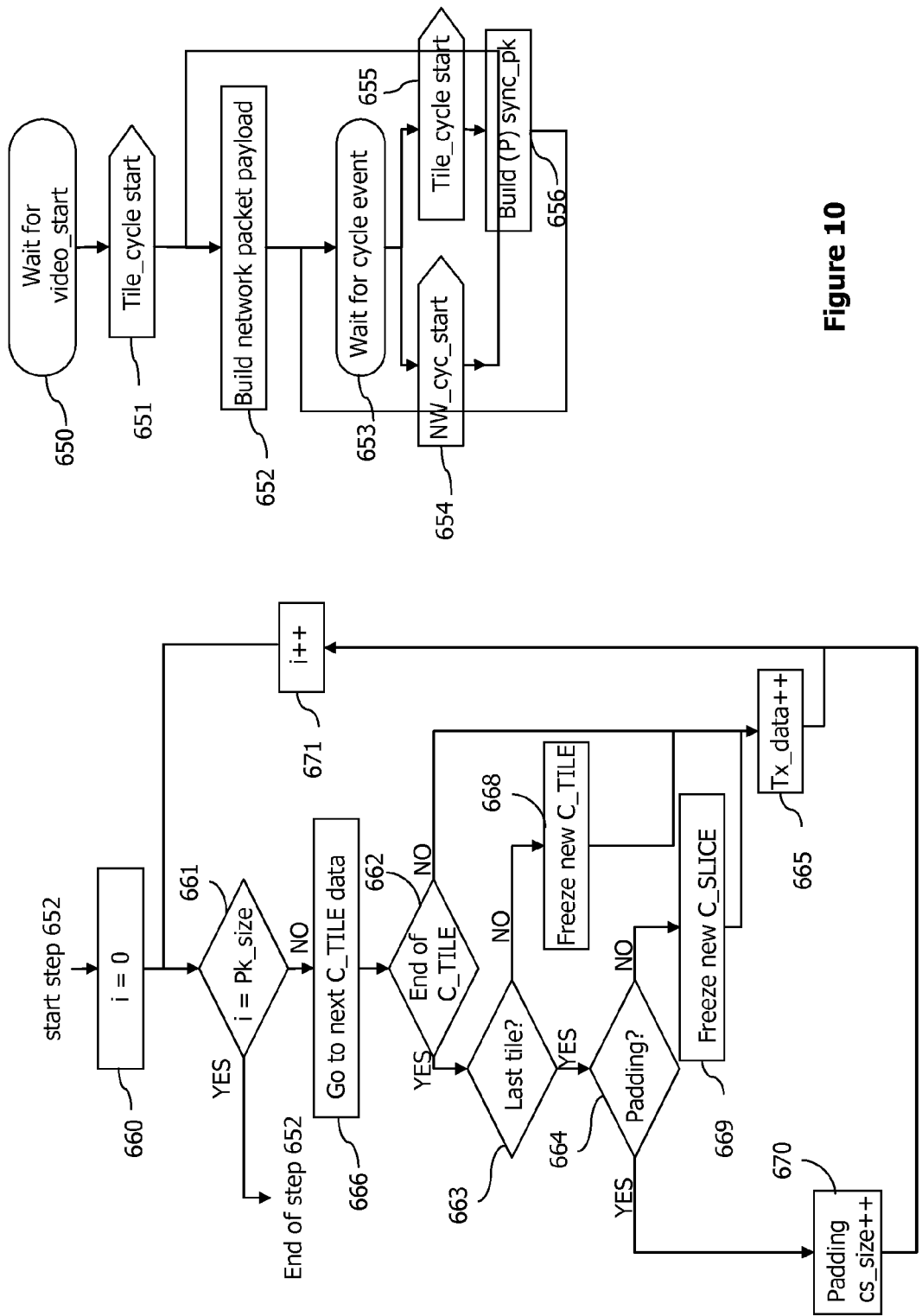
FIG. 10 illustrates a possible method for packetization of compressed data for transmission.

Detailed operation of the network packetization module 122 is described below with reference to FIG. 10.

The rate control module 130 and the network packetization module 122 work according to a latency target ENC_latency_Tgt and an average bit rate target ABR_Tgt respectively stored in the registers 132, 131, for instance in a host CPU interface 103 described below with reference to FIG. 2.

Figure 2:
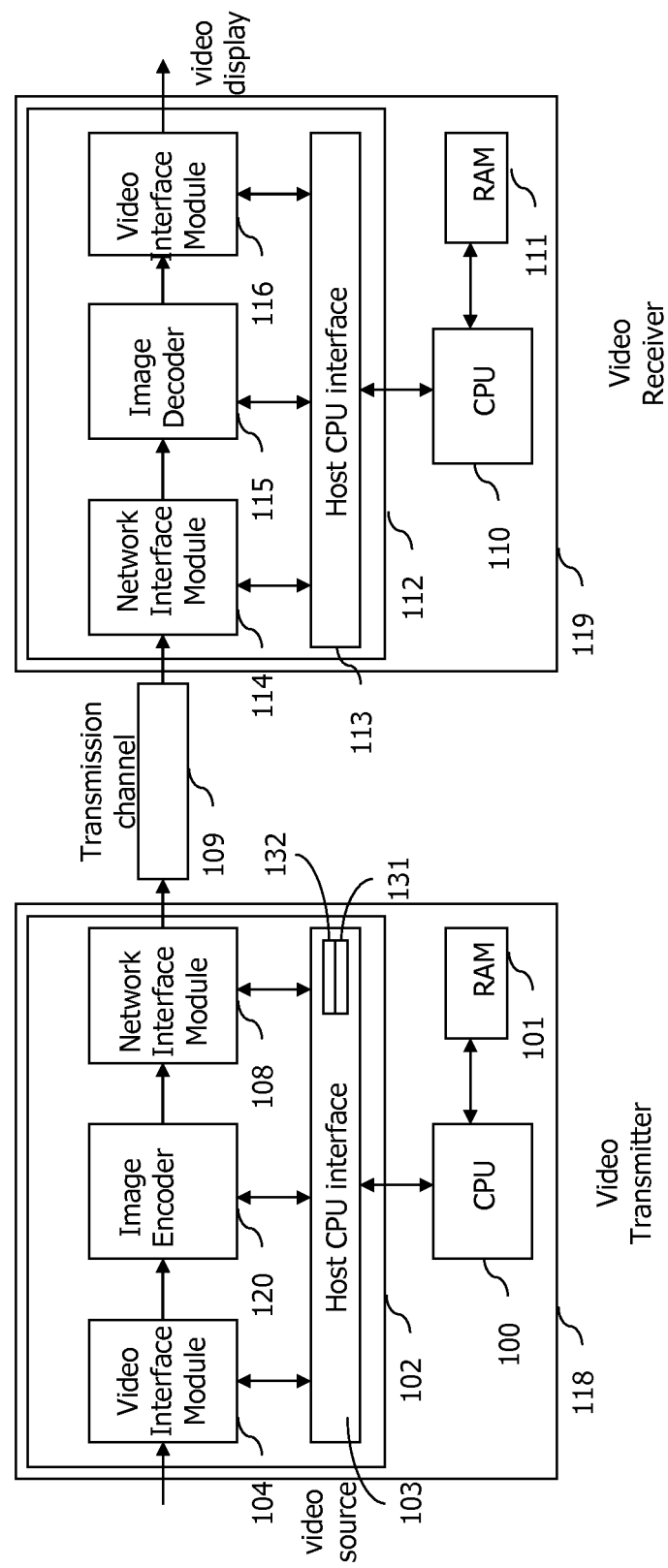
FIG. 2 illustrates a system including the video encoder of FIG. 1.

FIG. 2 describes a system using an image encoding apparatus 102 in which the image encoder 120 is embedded. On the emitter side, the system comprises a CPU 100 including a memory 101 and the image encoding apparatus 102 including the encoder 120. The image encoding apparatus 102 also includes a video interface module 104 receiving a digital video stream, for instance represented using the YUV format. In a possible embodiment, the video interface module 104 could format the video signals received from a standard video interface (such as HDMI) to generate the source video tile (S_TILE) signal 142 as well as the tile clock (TILE_clk) signal 140 representing the start of tile timing, and forward these signals to the image encoder 120 as already explained.

The image encoder 120 then generates a network packet transmission signal (TX_PCK) 143 for the network interface module 108 according to the network clock (NW_clk) signal 141, generated by the network interface module 108.

The network packet TX_PCK is then transmitted to a video receiver 119 via a transmission channel. On the receiver side, a network interface module 114 stores the received packets, before transferring them to a standard image decoder 115 according to synchronization information generated during network packetization on the emitter side and as described with reference to FIG. 10. Decompressed image data are then processed by a video interface module 116 having the task of transmitting video data, e.g. through an HDMI transceiver, to a display.

It may be noted that, as the transmitted compressed data are either encoded after applying the first level encoding pass only or after applying one (or more) second level encoding pass(es) (both giving rise to standard encoding), the decoder on the receiver side can be a standard decoder as well.

The overall system is controlled by a transmitter CPU 100 of the video transmitter 118 and a receiver CPU 110 of the video receiver 119, each having their own memory (respectively 101 and 111) for control software execution, for instance to proceed with system initialization and parameters configuration.

The CPU 100 and 110 are in charge of initializing system settings described in the table shown in the Appendix; in particular, the parameters corresponding to lines 1, 2, 6, 7, 9, 10 and 14 of the table are stored in the host CPU interface 103 on the emitter side and 113 on the receiver side. These registers are accessible to all other modules to define if necessary other parameter values, to be calculated according to the formulae described in the right hand column. In particular the system settings N_PARAM_1 and L_PARAM_1, as shown at lines 9 and 14 of the table, are stored, respectively, in the registers 131 and 132, as already noted and shown in FIG. 1.

FIG. 3 describes the memory organization of the bank of buffers C_TILE 150, storing information in a plurality of buffers C_TILE 151 to 154, each relating to a given tile and being identified by a unique identifier C_TILE.

A buffer C_TILE (e.g. 153) has the following memory structure:
- a quality factor (or quality parameter) field 155 representing the overall quality at tile level; this is for instance a measure of the difference, after applying some quantization at macro block level, compared to the source tile. Usually this information is first calculated at macro block level, as quantization may be expected to differ for each macro block. Next a global value is obtained at tile level representing the average difference, hereafter called Mean to Average Difference (MAD). MAD is for instance calculated only for the 8-bit luminance (Y) of the YUV colour space:

$$MAD = \frac{1}{m \cdot n} \sum_{i=0}^{m-1} \sum_{j=0}^{n-1} |Y_{S_{i,j}} - Y_{q_{i,j}}|$$

wherein n is the number of pixels per line (for instance 1920), m the number of lines per tile (for instance 16), $Y_{S_{i,j}}$ is the luminance value of the original pixel at the $(j+1)^{th}$ column and $(i+1)^{th}$ line and $Y_{q_{i,j}}$ is the luminance value of the decoded pixel (at the same position) after application of quantization. This quality factor may also include additional information such as a quantization map, representing the quantization value for each macro block of the tile. Any other relevant calculation method could however alternatively be used here, such as Mean Squared Error (MSE):

$$MSE = \frac{1}{m \cdot n} \sum_{i=0}^{m-1} \sum_{j=0}^{n-1} |Y_{S_{i,j}} - Y_{q_{i,j}}|^2$$

The memory structure of a buffer C_TILE (e.g. 153) further comprises:
- a size field (ct_size) 157, representing the size of the tile, expressed in number of bytes, as the sum of the size of each encoded macro block after entropy encoding;
- a payload field 158 describing the value of each encoded macro block for the tile (i.e. comprising the compressed data representing the tile per se);
- a protocol field 159 used to add transport protocol information, comprising among others: size of useful data, redundancy for Forward Error Correction, and/or any other necessary information allowing the receiver to handle transmission errors;
- a Tx_data indication field 160, to be modified by the network packetization module 122 (see detailed description with reference to FIG. 10), when transmission of the tile over the network has started, meaning that the compressed data can no longer be modified. The value of the field may then be analyzed by the synchronized rate control module 130 either (a) when performing tile selection aiming at a second level encoding pass (step 219 detailed below) or (b) when checking the results of a second level encoding pass, i.e. before withdrawing the compressed data obtained by a previous encoding pass (either a first level encoding pass or a second level encoding pass) in favour of the compressed data obtained by this second level encoding pass (at step 215 explained below with reference to FIG. 5);

a field 156 used to store the intermediate results IT_TILE obtained by the integer transform module 125 for the tile.

FIG. 4 describes the memory organization of the bank of buffers C_SLICE, to be managed, for example, as a circular buffer 170. The size of the circular buffer (number of buffers C_SLICE) is defined according to the maximum latency to be supported by the system (from the interface with the video source up to the interface with the video display), taking into account the number of tiles per slice.

This circular buffer 170 is made of several buffers C_SLICE 171 to 174, all having the same memory structure and each describing the composition of the considered slice in terms of tiles. Each buffer C_SLICE comprises:

a quality factor field 175 representing the overall quality at slice level, for instance determined from an average value representing the quality at tile level (see field 155 above) calculated taking into account each tile within the slice;

a size field (w_size) 176, representing the size of the slice, expressed in number of tiles (i.e. the currently expected number of tiles within the slice);

a size field (cs_size) 177, representing the size of the slice, expressed in number of bytes as the sum of the sizes of the compressed tiles forming the slice;

a set of fields 178 to 180, representing indexes of the C_TILE buffers containing the tiles forming the slice. The index pointing to the last tile of the slice is followed by a null tile index.

Figure 5:
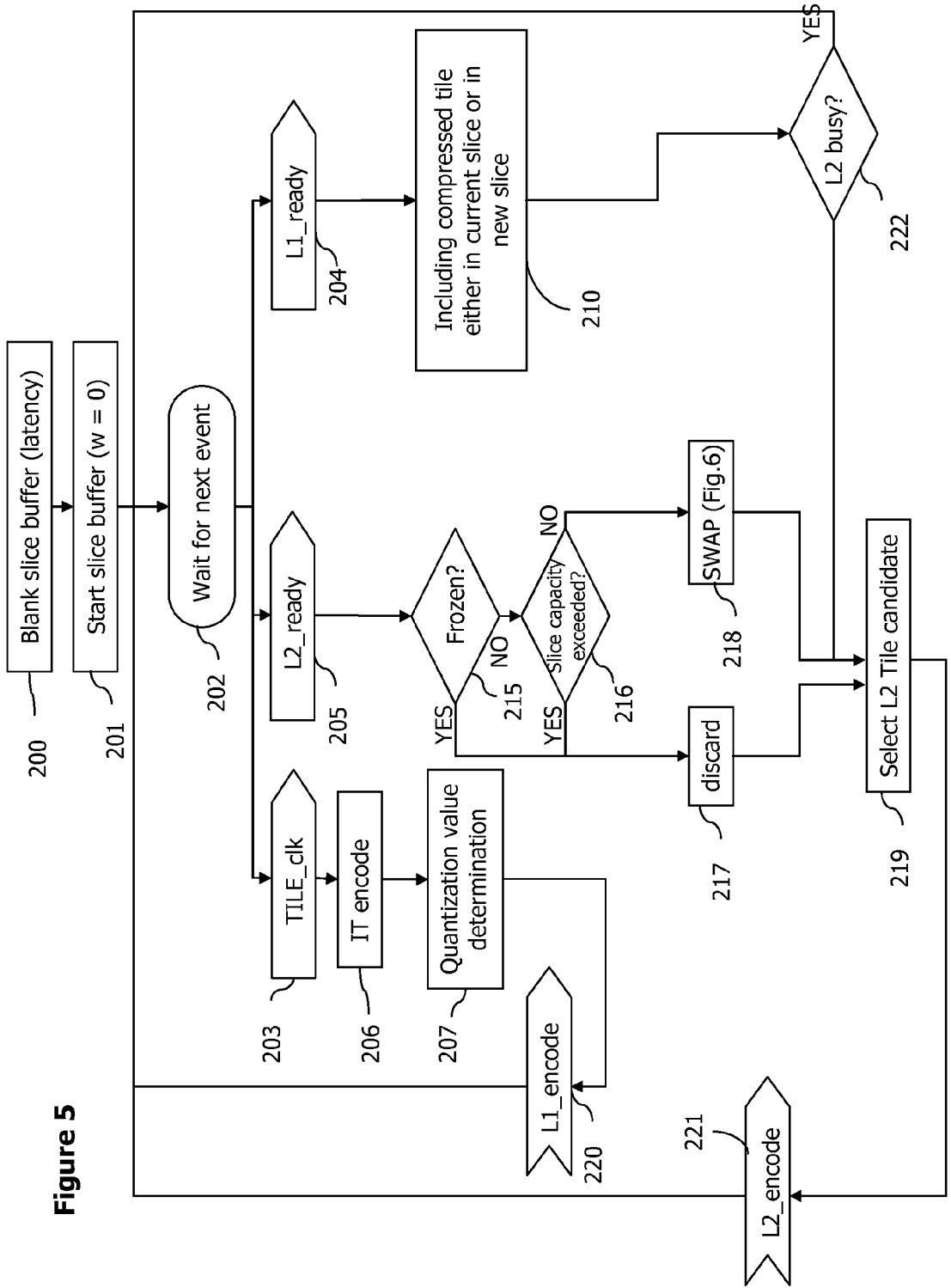
FIG. 5 depicts the general steps of operation of the encoder of FIG. 1.

FIG. 5 shows the process implemented by the synchronized rate control module 130.

Before turning to the running phase of the process, it may be pointed out that the rate control module 130 is in charge of encoder initialisation. On system reset, it creates a blank slice buffer (such as the ones described with reference to FIG. 4) having w_size field 176 set to a predefined MAX_W_SIZE value (step 200) and all compressed tile buffer addresses set to null, representing an empty compressed slice artificially including MAX_W_SIZE tiles.

MAX_W_SIZE value (see line 15 of the table in Appendix), describing the maximum number of tiles per slice, is defined from a latency target value (ENC_latency_Tgt) and an average bit rate target value (ABR_Tgt), respectively stored in the registers 132 and 131 as already noted.

The latency target value (register 132) must be greater than the duration of one tile while including some safety margin. Furthermore this latency target value must always be larger than the maximum time required to completely perform the first level encoding pass for a tile having the worst case complexity.

Defining a blank slice buffer artificially including MAX_W_SIZE tiles drives the network packetization module 122 to wait for a period corresponding to the encoder latency (as from system reset) before starting to transmit compressed data actually provided by the encoder.

The encoder peak bit rate is defined according to the maximum size PBR_CT_SIZE of a compressed tile. This is a configuration parameter that dimensions hardware resources, especially defining the size of the compressed tile payload field 158.

Next, in order to launch the running phase at step 201, a new slice buffer is allocated, called current slice buffer, where the results of compression are to be stored. By default, the value of the size field 176 is set to MAX_W_SIZE. At this point, none of the compressed tile buffer has been allocated, so all fields 178 to 180 are set to null and the number of actually encoded tiles for this slice equals 0. Hereafter 'w' represents the number of actually encoded tiles for the current slice. At this point w equals 0.

In addition MAX_W_FEED is defined as the current slice capacity in bytes, thus according to the following formula:

$$MAX\_W\_FEED = w\_size * ABR\_CT\_SIZE,$$

wherein w_size is the value of the field 176 of the current slice as expressed in the corresponding buffer C_SLICE, and wherein ABR_CT_SIZE corresponds to the average bit rate value at tile level (as shown at line 13 of the table in Appendix), whereas the value ABR_Tgt, from which ABR_CT_SIZE is derived, corresponds to the average bit rate value expressed in bits per second (INT being the integer function which keeps only the integer part of a possibly non-integer number).

At next step 202, the rate control module 130 awaits a synchronization event, to be either:

a tile cycle start event (step 203), based on the signal TILE_clk generated by the video interface module 104 as previously explained;

a first level encoding termination event 204, based on the signal L1_ready generated by the CAVLC module 127 after completion of the encoding of a compressed tile using the first level encoding pass;

a second level encoding termination event 205, generated by the CAVLC module 129 after completion of the encoding of a compressed tile by the second level encoding pass; the event provides a reference to the slice as well as to the position of the tile within the slice. The slice, as well as the tile position within the slice, has to be referenced, to be recorded later (step 218) in the payload field of the appropriate buffer C_TILE, within the appropriate buffer C_SLICE. Contrary to the first level encoding pass, the second level encoding pass does not process the tiles according to their relative time ordering, but according to a decision of the rate control module 130 (step 219) as described below.

Starting with the process following the tile cycle start event, at step 206, the integer transform of every incoming tile is calculated by the module 125 immediately after being triggered by the TILE_clk signal.

Next, at step 207, the quantization value to be used is determined according to a process described below before starting, at step 220, the first level encoding by the modules 126 and 127.

On receiving the L1_ready signal indicative of a first level encoding termination (step 204), the module 130 checks the result obtained (i.e. data C1_TILE stored in the memory 121) in order to determine whether this compressed data C1_TILE should be included in the current slice or in a new (empty) slice (step 210).

Figure 7:
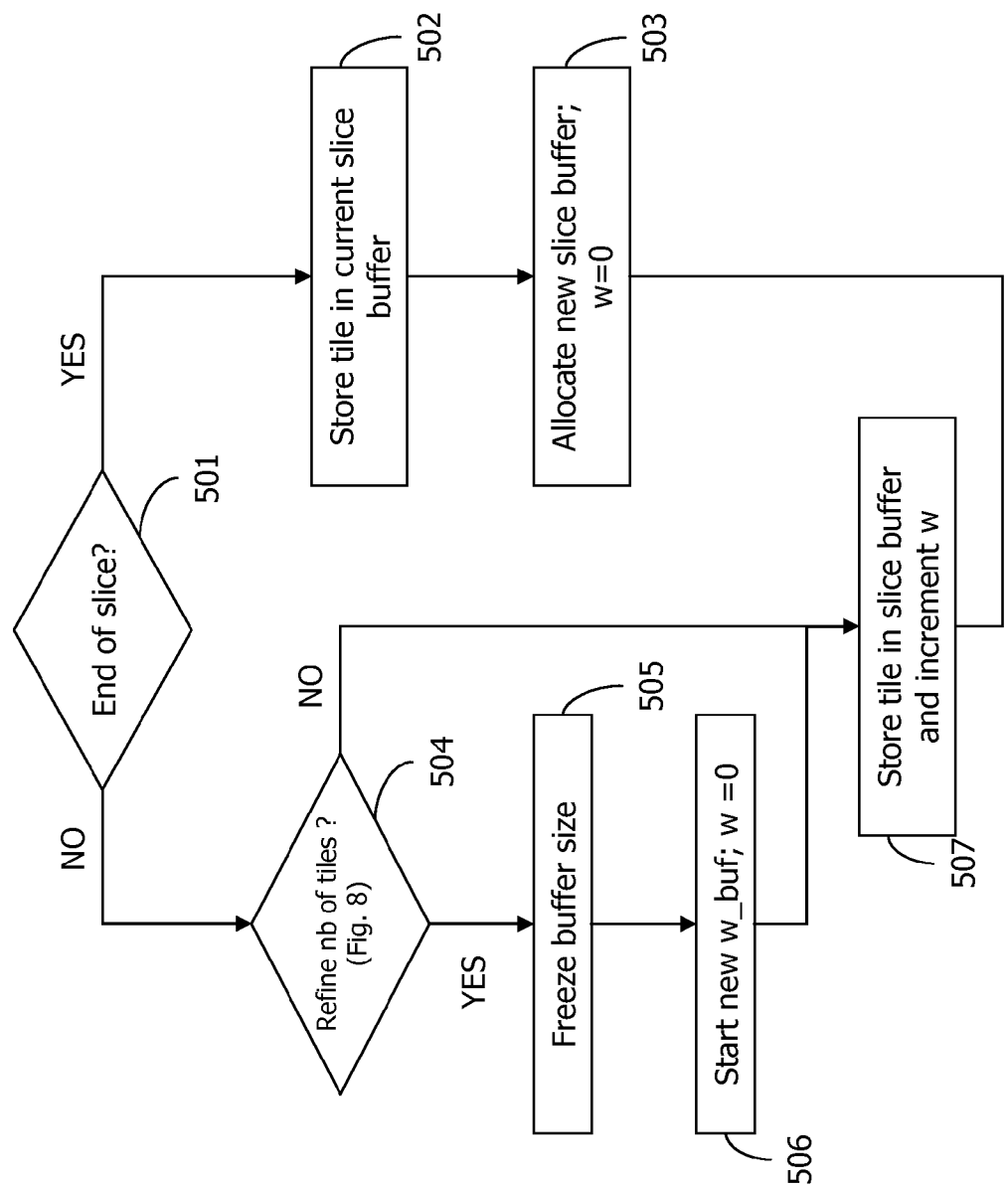
FIG. 7 shows an example of algorithm for determining the inclusion of tiles in slices.

A possible embodiment to implement this step (210) is described below with reference to FIG. 7.

After the new compressed tile is included in a slice, it is checked in step 222 whether a second level encoding is currently in progress. If yes, the algorithm returns to step 202, waiting for a next event. If no, the process of starting a second level encoding of a tile (steps 219 and 221) is implemented as explained below.

After notification of a second level encoding termination (step 205), the rate control module 130 checks the obtained result (C2_TILE stored in the memory 121).

Before deciding to swap with the new value at step 218 (i.e. to update the buffer C_TILE of the considered tile with the buffer identified by C2_TILE and thus to designate this last buffer as the compressed data currently planned for transmission), it is checked:

whether transmission of the tile to be swapped has started at step 215 (by checking Tx_data field 160 for the considered compressed tile);

then, if transmission has not started yet, whether an estimated new value, taking into account the size of C2_TILE, for the cs_size field of the buffer C_SLICE being currently filled in, at step 216, exceeds the value MAX_W_FEED of this buffer C_SLICE.

If any of the two conditions above is met, the result C2_TILE of the second level encoding pass is discarded at step 217.

Figure 6:
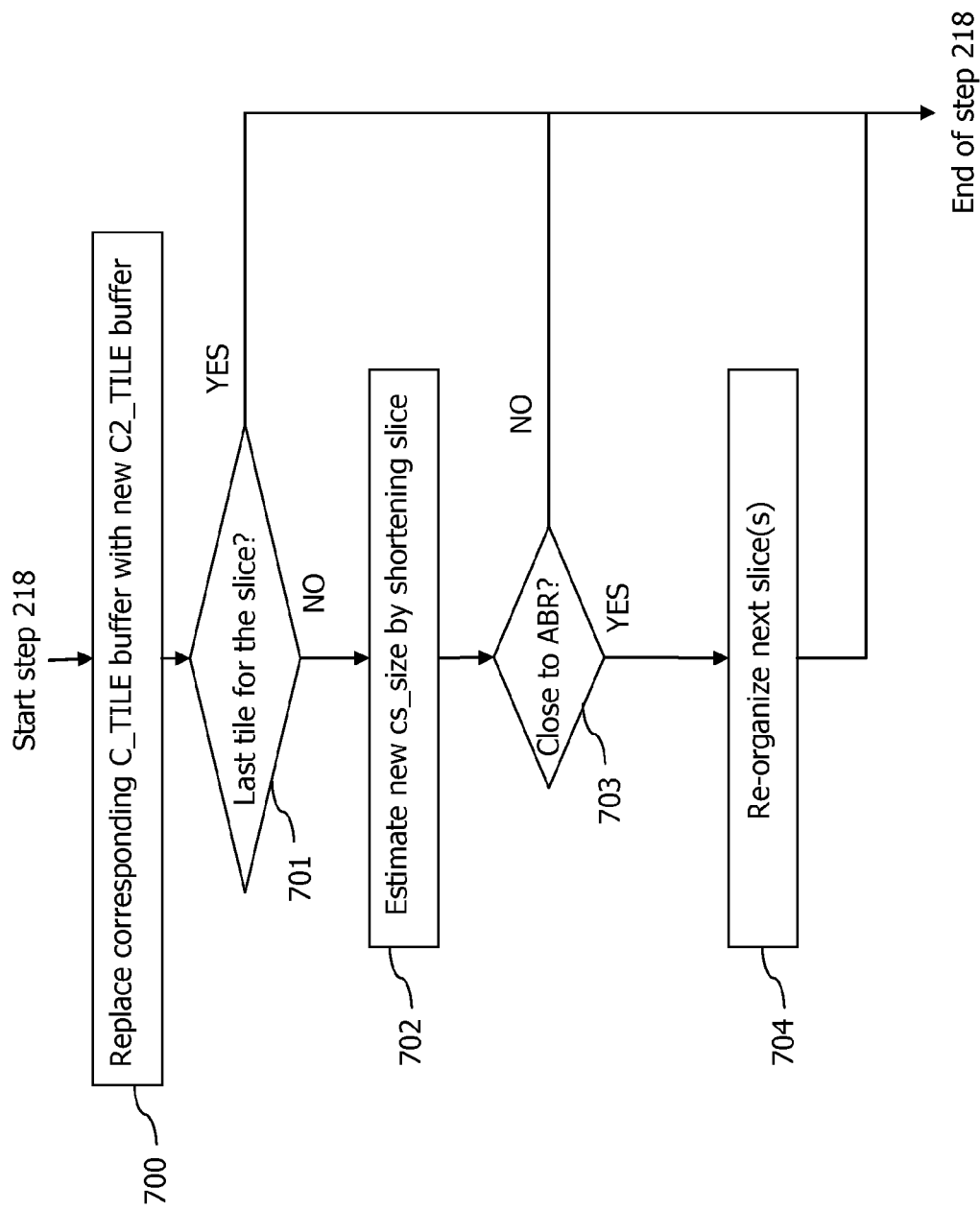
FIG. 6 depicts an example of algorithm for redistributing slice allocation following an application of a second processing pass.

Otherwise, step 218 is performed. The corresponding processing is described more in detail in reference to FIG. 6:

In step 700, the value of cs_size (field 177) of the buffer C_SLICE under consideration is adjusted according to the ct_size (field 157) value of buffer identified by C2_TILE, and the buffer identified by C2_TILE replaces the buffer C_TILE used so far for the compressed tile (by swapping the buffer addresses in the corresponding buffer C_SLICE). The buffer C_TILE previously in use is then available for processing any future tile.

It is then verified thanks to the steps described just below if the replacement of the buffer C_TILE with the (possibly larger) buffer C2_TILE should have any consequence on the inclusion of the tiles in the slices.

First, in step 701, a test is done to check if the size of the slice currently filled corresponds to MAX_W_SIZE, and in this case, if the concerned tile is at last index.

If it is the case, no further processing is performed (i.e. there is no consequence on slice definition) and step 218 is terminated. Conversely, a tentative of re-organizing the already filled-up slices is performed. A tile in an already filled-up slice can be re-allocated to a different slice (generally speaking, when the slice becomes too large because of the replacement of the buffer C_TILE with the buffer C2_TILE), unless this tile is considered as frozen.

In step 702, a new cs_size field is first computed assuming the tile identified by C2_TILE is closing the slice (i.e. would become the last tile of the slice).

Then, in step 703, a test is done to check whether the computed new cs_size is greater than a threshold value, for instance being defined as 90% of the value ABR_CT_SIZE*w_size. As a variant, this threshold value is adjustable and can be refined to improve overall performance of the encoding.

In the negative, no modification is performed and step 218 is terminated.

Figure 11:
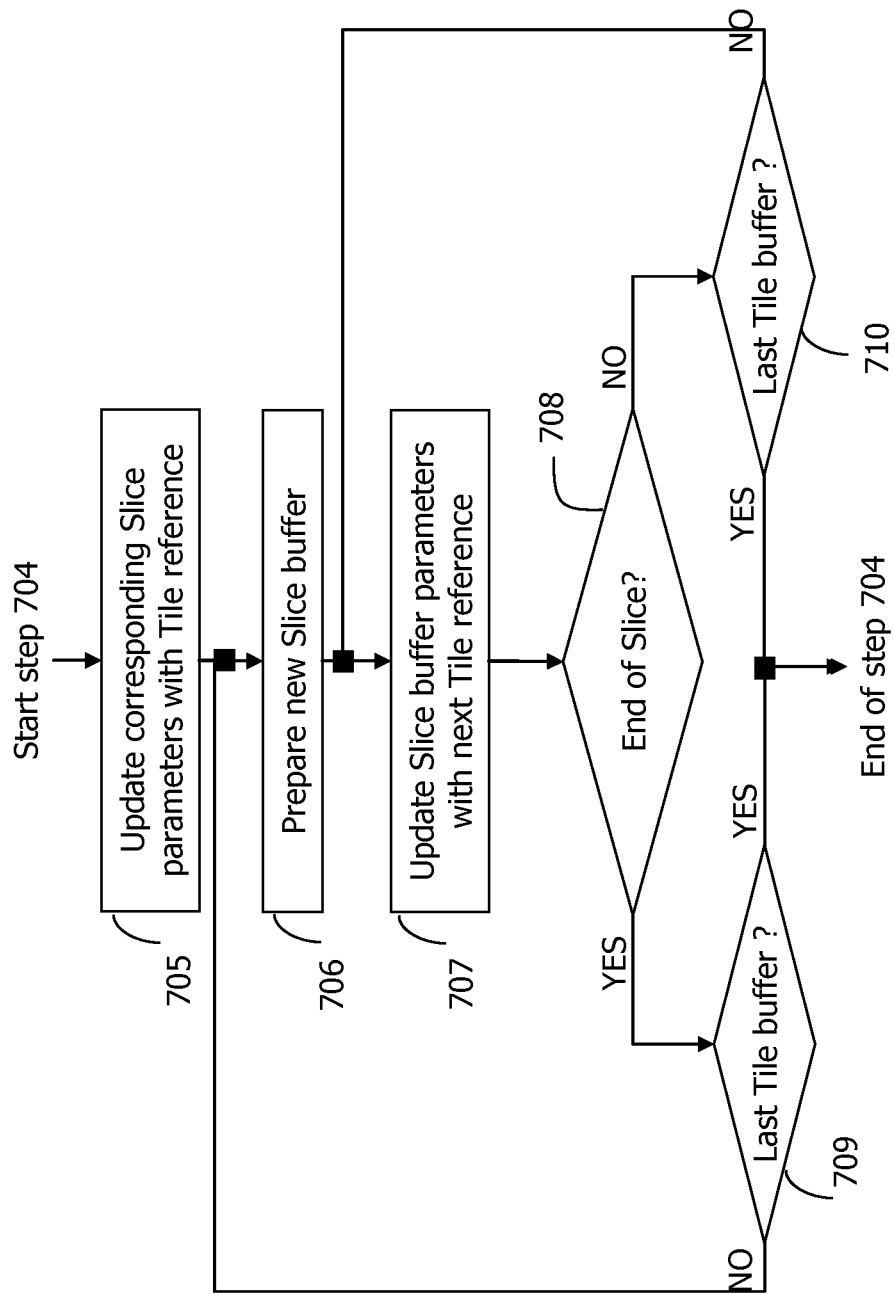
FIG. 11 illustrates a re-organization of the slice buffers when a slice is adjusted after execution of a second level encoding pass.

In the affirmative, step 704 is executed. This step is detailed below, with reference to FIG. 11:

In step 705, the slice under process is closed with the tile of C2_TILE, and the corresponding slice parameters 175 to 180 (referring to FIG. 4) are updated with C2_TILE information (index, size).

Then, in step 706, a new slice buffer is prepared to initiate slice re-organization of already filled subsequent slices.

In step 707, the slice buffer parameters are updated with the information of the next tile (index, size).

Then, in step 708, a test is performed to check if at least one criterion for closing current slice is met or not. This test is similar to test 504 of FIG. 7.

If test 708 is positive, a subsequent test 709 is performed to check if the concerned tile is the last filled tile of the buffer If test 709 is positive, step 704 is terminated.

If test 709 is negative, a loopback to step 706 is performed to continue re-organization with the next slice.

If test 708 is negative, a subsequent test 710 is done to check if the concerned tile is the last filled tile of the buffer If test 710 is positive, step 704 is terminated.

If test 710 is negative, a loopback to step 707 is performed to continue the re-organization of the current slice.

Once the results of the second level encoding for the current tile have been processed as just mentioned, a second level encoding of another tile may be performed as now described.

First, at step 219, selection of an appropriate tile candidate to apply a another iteration of the second level encoding and adjustment of a corresponding quantization value, to improve overall quality, are performed as described below with reference to FIG. 9.

Next, at step 221, a second level encoding is started (only if a tile has been selected during step 219, together with a corresponding quantization value).

Having now described the general process implemented by the control module 130 with reference to FIG. 5, several aspects will now be described in more detail as already indicated.

According to a possible embodiment, step 207 of determining a quantization value can be implemented as follows:

when the current tile is the first tile of a slice (w=0), the quantization value is set to:

(1) an average value QZ_MEAN cumulated for instance over the last 1000 video frames (roughly corresponding to the last 10 seconds of video), and ensuring that the compressed tile size will not exceed ABR_CT_size (parameter shown at line 13 of the table in Appendix), except in the following two cases; QZ_MEAN can be also a typical value obtained from encoding experience performed on reference video frames, representative of the targeted application.

(2) a more accurate than average quantization value (i.e. a value smaller than QZ_MEAN), when the last tile of the previous slice was detected as having significantly low complexity (i.e. when the size of the compressed tile is smaller than a predefined threshold value, for instance defined as 75% of ABR_CT_SIZE);

(3) a less accurate than average quantization value (greater than QZ_MEAN), when the last tile of the previous slice was detected as having significantly high complexity (i.e. when the size of the compressed tile is greater than a predefined threshold value, for instance defined as 90% of ABR_CT_SIZE);

otherwise (if the current tile is not the first tile of the slice, w>0), the predefined quantization value is set to:

(1) the average value QZ_MEAN, when for this new slice, current size (value of cs_size field 176) is close to nominal value (e.g. greater than a predefined threshold value, for instance defined as 80% of w*ABR_CT_SIZE size, but less than w*ABR_CT_SIZE) to ensure the compressed tile size does not exceed ABR_CT_size (parameter at line 13 of the table in Appendix);

(2) a more accurate than average quantization value (smaller than QZ_MEAN), when for this new slice, the current slice size is significantly low (e.g. smaller than a predefined threshold value, for instance defined as 80% of w*ABR_CT_SIZE size);

(3) a less accurate than average quantization value (greater than QZ_MEAN), when for this new slice, the current slice size is significantly high (greater than w*ABR_CT_SIZE).

In addition to the criteria above, the quantization value can be adjusted at macro block level according to an estimation step (conventional per se) that aims at estimating the resulting bit rate after entropy encoding.

Choosing the quantization value before first level encoding as just explained allows anticipation of bit rate optimization at slice level based on past experience. Furthermore the predefined threshold values introduced above can be adjusted (fine tuning) in order to improve the video quality.

As possible variations, different quantization parameter refinement strategies or algorithms can be implemented, based on profiling methods, or relying for example on quantization parameter filtering, or on prediction algorithms based on monitoring during processing over a variable number of preceding tiles, slices or frames.

A description will now be given with reference to FIG. 7 of a possible embodiment for step 210 of determining the slice inclusion for a tile that is just compressed using the first level encoding.

First it is checked at step 501 whether the tile just compressed is the last one for the current slice, actually when having w=(w_size−1).

If it is,
- in step 502, the compressed tile result C1_TILE is first associated with the current slice buffer, and the compressed tile buffer identifier (the buffer C1_TILE) is recorded into the current slice buffer C_SLICE. Furthermore the average quality factor corresponding to the current slice buffer is updated and stored in the quality factor field 175;
- in step 503, a new slice buffer is allocated, to become the new current slice buffer, where the results of the following first level encoding are stored. By default, the value of w_size field 176 is set to MAX_W_SIZE. The current number of compressed (or encoded) tiles is set to 0 (w=0), following the same process as performed at step 201.

Otherwise, at step 504, it is checked whether it is pertinent to adjust (i.e. to refine) the currently expected number w_size of tiles in the slice as a function of the progress of the encoding process. This check is performed according to decision criteria that are detailed relatively to FIG. 8.

Figure 8:
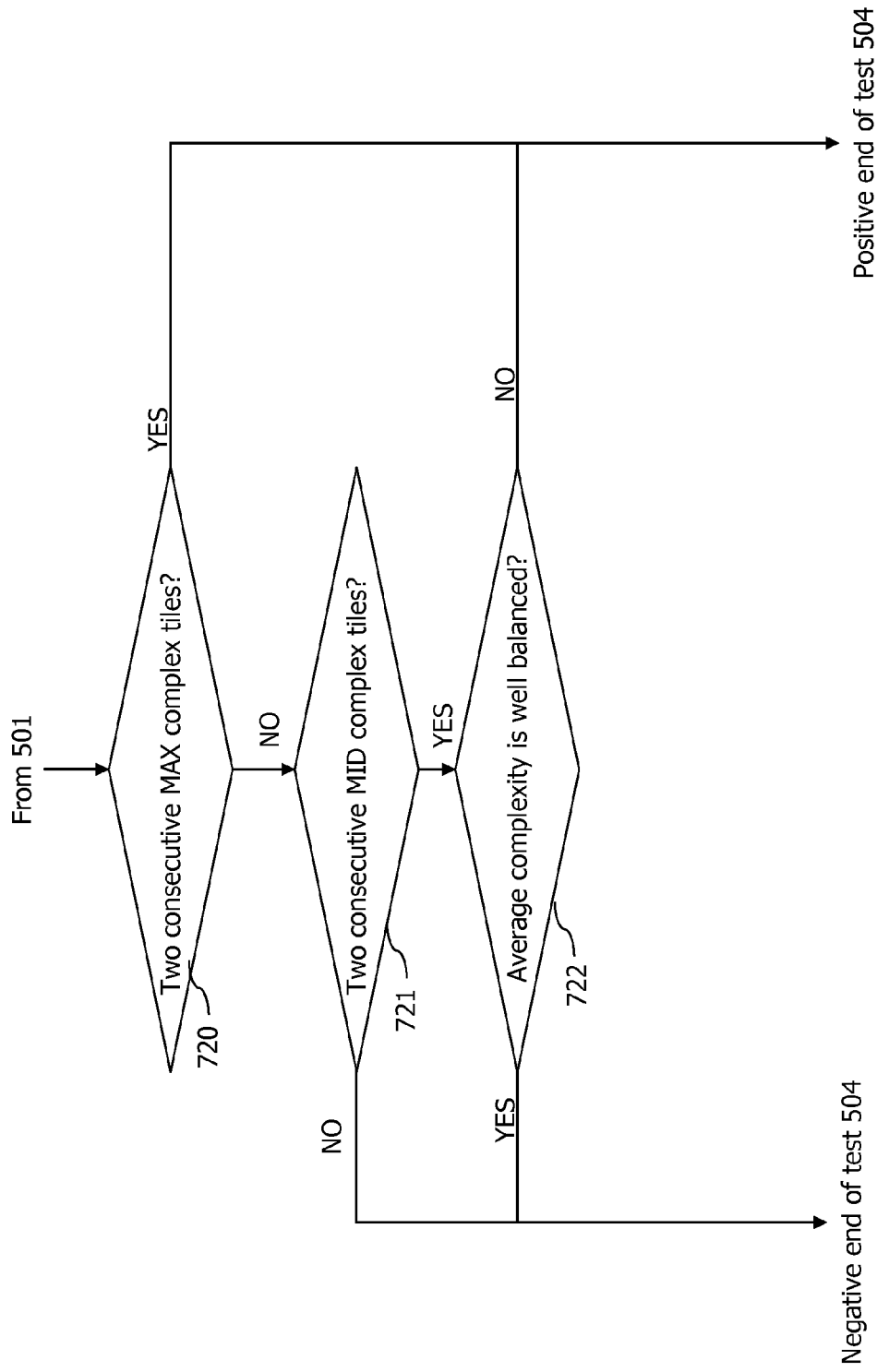
FIG. 8 depicts an example of algorithm used to decide slice termination resulting in slices of variable size.

Referring to FIG. 8, at step 720, it is checked whether the last tile included in the slice and the last compressed tile are both tiles of maximum complexity (labelled as "MAX complex"). In case of a positive check at step 720, the two consecutive complex tiles have to be placed in two separate slices, and the termination of the current slice is then anticipated.

Tile complexity depends on the compressed tile quality factor versus the compressed tile size. The compressed tile quality factor value is stored in the quality factor field 155. The compressed tile size is stored in ct_size field 157. A tile is considered to be complex when the quality factor value is smaller than a quality threshold value called MAD_MEAN, while ct_size is greater than ABR_CT_SIZE. Similarly, a compressed tile is considered to be complex when its size is exceeding ABR_CT_SIZE, for a given quantization value equal or greater than QZ_MEAN.

For instance, a tile of maximum complexity ("MAX complex") is detected when:
(1) for a quantization value twice greater than QZ_MEAN, the size of the compressed tile is greater than a predefined threshold value, for instance defined as 90% of ABR_CT_SIZE;
(2) for a quantization value greater than QZ_MEAN, the size of the compressed tile is greater than a predefined threshold value, for instance defined as 110% of ABR_CT_SIZE);

Minimum complexity ("MID complex") is detected for a non-"MAX complex" tile when:
(3) for a quantization value greater or equal to QZ_MEAN, the size of the compressed tile is greater than a predefined threshold value, for instance defined as 90% of ABR_CT_SIZE;

Obviously such threshold values are illustrative and could be adjusted depending on overall encoding performances.

At step 721, it is checked whether the last tile included in the slice and the last compressed tile are both "MID complex" tiles. In case of a positive check at step 721, the overall quality of the slice is checked at step 722.

At step 722, for the current slice, overall slice quality factor is computed as the mean value of slice tiles quality factor (value of field 155 of C_TILE buffer memory structure), including the last compressed tile. If the obtained quality factor is smaller than the predefined quality threshold MAD_MEAN, the two consecutive "MID complex" tiles are spread into different slices and the result of test 504 is positive.

When the check at step 721 is negative or the check at step 722 is positive, test 504 is negative, meaning that either there is room to improve slice quality or the slice quality is already fine.

Variants can be introduced here to add criteria to decide anticipated slice termination, for instance checking the high quality (slightly above MAD_MEAN) of the current slice. Adjusting MAD_MEAN value from experimentation would allow improving encoder performances.

Now referring back to FIG. 7, when both the current tile and the previous tile are considered as complex tiles, the test 504 is positive and the current tile is included in a new slice as described below (starting at step 505). Otherwise it is negative and step 507 is executed.

It may be noted that adjusting slice size would help here to better spread compressed tile complexity between different slices, to allow better usage of available bandwidth.

Step 505 thus anticipates the end of the current slice, for the corresponding current slice buffer, by adjusting w_size field 176 to the current value of 'w'.

In step 506, a new slice buffer is allocated, to become the new current slice buffer, where the results of the first level encoding just completed are stored. The current number of compressed tiles is then null (w=0). By default, the value of w_size field 176 (for the new slice) is set to MAX_W_SIZE.

At step 507, the compressed tile result C1_TILE is associated with the corresponding current slice buffer, by recording in this slice buffer the identifier of the tile buffer C1_TILE. Then the average quality factor corresponding to the current slice buffer is updated and stored in the quality factor field 175. Finally the number of compressed tiles within the current slice buffer is incremented Different slice formatting strategies or algorithms can be implemented, based on profiling methods, or relying for example on mean quality parameter filtering, or on prediction algorithms based on monitoring during processing over a variable number of preceding tiles, slices or frames.

A possible embodiment for step 219 of selecting a tile to be encoded by application of a second level encoding pass is now described with reference to FIG. 9.

In this embodiment, it is assumed that aggressive compression would be performed at the first stage (using first level encoding) and that the goal of the second level encoding would be to try to improve the quality, without however exceeding the maximum slice size MAX_W_FEED, previously defined (w_size*ABR_CT_SIZE).

Figure 9:
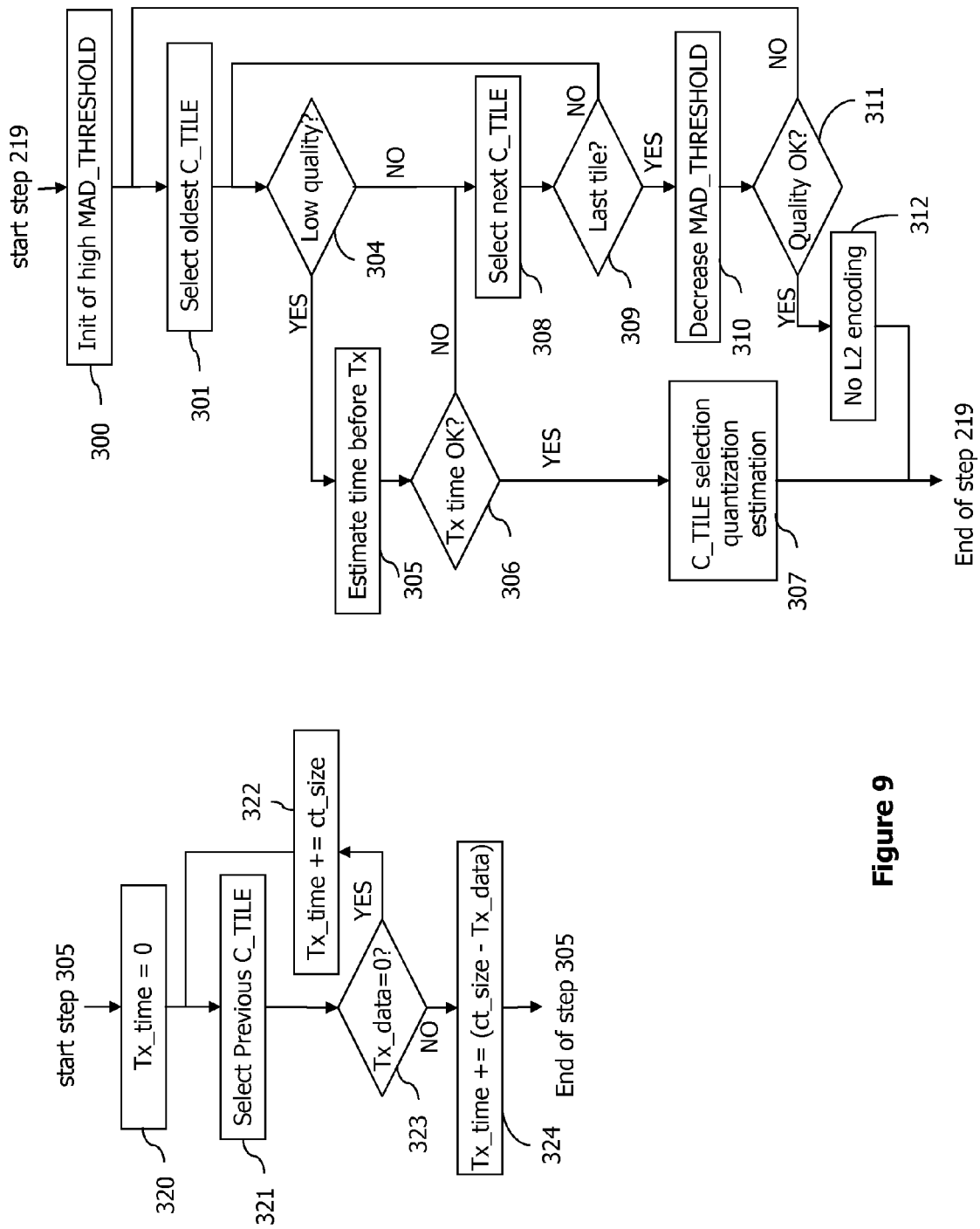
FIG. 9 illustrates a process for selecting tiles to be encoded by execution of a second processing pass.

The right-hand side of FIG. 9 describes the search algorithm implemented throughout the (compressed tile) bank of buffers C_TILE.

The search algorithm first initializes the quality factor threshold value (step 300) with a predefined value MAD_THRESHOLD (corresponding to a tile of rather low quality).

The search algorithm then looks for the oldest compressed tile, which is the tile to be transmitted just after the one currently under transmission (step 301). This is performed by analyzing Tx_data indication field 160 for the oldest compressed slice C_SLICE, starting from the first compressed tile C_TILE.

For the selected (oldest) buffer C_TILE, the quality is compared to MAD_THRESHOLD (step 304). If this compressed tile is of lower quality (i.e. when the value of the field QF 155 is greater than or equal to MAD_THRESHOLD), step 305 is executed as described later; otherwise at step 308, the next tile (following the one under consideration) is selected, if any remains.

Selecting the next tile (step 308) also includes the operation of moving to a next slice when the end of a slice has been reached.

If the most recent tile has been checked, test 309 is positive and the MAD_THRESHOLD value is decreased in step 310, until a minimum (so-called acceptable) value of MAX_THRESHOLD is reached. In case this threshold value is actually reached, the result at step 311 is positive and the in-progress second level encoding is not performed (step 312). Otherwise the new MAD_THRESHOLD value is applied, and the processing goes back to step 301 in order to search again (from the oldest tile) for a compressed tile to be encoded (this time with a lower threshold, i.e. a higher quality goal).

The left-hand side of FIG. 9 describes a possible implementation of step 305, as one example to estimate the remaining time before transmission. It is clear that the remaining time before transmission corresponds to the remaining time to perform extra encoding iteration, using the second level encoding, i.e. to perform another second level encoding pass.

At step 320 a Tx_time counter (representative of a quantity of data) is set to 0.

Then, after stepping back to the previous compressed tile (step 321), the Tx_time counter is incremented:
- by the ct_size value field 157 if the transmission has not been started for this tile (based on the value of Tx_data field 160, i.e. test 323 is positive),
- by the ct_size value of the field 157, minus the number of transmitted data (Tx_data value of field 160) if transmission has already started for this tile (based on the Tx_data value of the field 160, i.e. test 323 is negative).

After execution of step 322, at step 321, the previous compressed tile is stepped back to, towards the oldest one.

It may be noted that selecting the previous tile (step 322) also includes moving to the previous slice when the beginning of a slice has been reached.

After executing step 324, step 305 terminates, and test 306 is implemented, where the estimated time is compared to a predefined value corresponding e.g. to a maximum foreseeable time needed for performing a second level encoding pass and defined according to system parameters.

Steps 305 and 306 allow tile selection for application of the second level encoding while ensuring there is enough time for an execution of this second level encoding.

If the test is negative, a further tile candidate is searched for at step 308 already described. Otherwise an estimation of the quantization parameters $QP_2$ is performed for the selected tile (step 307) thus ending step 219 before using the quantization value for the second level encoding (step 221 in FIG. 5).

The step of estimating the quantization value is for instance implemented by decreasing this value compared to the one used for the previous CAVLC encoding of the preceding pass performed on the tile (either first pass encoding or second pass encoding). For instance one quantization unit decrement is applied to all macro blocks. It can also be considered applying new quantization parameters $QP_2$ for some macro blocks only within the tile, e.g. these macroblocks for which quality is low (using for instance a mean to average difference at macroblock level).

It is to be recalled that decreasing the quantization value increases encoding quality.

A possible embodiment of operation of the network packetization module 122 is now described with reference to FIG. 10.

The network packetization module 122 awaits a video start signal, at step 650, until a start of video frame event (step 651) is received, such as the first tile cycle event (TILE_clk signal 140) generated by video interface module 104.

A start of tile event is generated by the video interface module 104, and referenced as TILE_clk 140 in FIG. 1.

A packet transmission event is generated by the network interface module 108, and referenced as NW_clk 141 in FIG. 1.

YUV encoded source tile information is provided by the video interface module 104 to the image encoder 120 via the input signals S_TILE 142, as illustrated in FIG. 1.

The payload of network packets is provided to the network interface module 108 by the image encoder 120 via the output signals TX_PCK 143, as illustrated in FIG. 1.

The payload of the network packets is prepared to be ready for transmission in step 652. This operation is further described on the left-hand side of FIG. 10, through steps 660 to 671.

After completion of the network packet payload construction, the network packetization module awaits a next event, step 653, to be either a start of tile event, step 655, or a packet transmission event, step 654:
- after receiving a packet transmission event (an event representative of a completed packet transmission) a new packet payload is prepared, by executing again step 652;
- after receiving a tile start event, at step 656, a start of tile offset is recorded. This offset is being representative of a lapse of time from the previous packet transmission event and the tile start event. The resulting offset information can be sent along packet payload, as protocol information to be stored in the field 159 for the corresponding tile, in order to allow the video receiver synchronizing its decoding operation at packet reception.

The packet payload (step 652 previously referred to) construction starts at step 660, initializing a counter to 0. This counter represents current packet payload size. Therefore the operation of data storage in the packet payload is repeated until the whole packet payload is full, that is when test 661 is positive. This terminates the packet payload construction process then the process returns to the main network packetization algorithm (step 653).

Until the packet payload is full (test 661 is negative), step 666 identifies next compressed tile data to transmit. Test 662 checks whether the value of Tx_data field 160 equals the value of ct_size field 157 in order to check whether all the compressed data of the tile have been transferred to the packet payload.

When test 662 is negative, next compressed tile data to transmit is transferred to the packet payload buffer (step 665)

and the Tx_data field 160 is correspondingly incremented. Then the packet payload size is also correspondingly incremented (step 671).

On the other hand, when test 662 is positive, the whole compressed tile has already been processed for transmission and the corresponding compressed tile buffer can be released. Next, the end of slice is tested at step 663. If the end of slice is detected, step 664 described below is executed, otherwise step 668 is executed.

At step 668, transmission of a new compressed tile starts by identifying first compressed tile data to transmit for this compressed tile. Then step 665 is executed to transfer data to the packet payload for transmission and to update the Tx_data field 160 of the new tile.

Test 664 checks the necessity for padding the packet payload by checking cs_size.

At this stage all compressed data of the slice have already been transmitted, but target Average Bit Rate might not be reached yet for the slice:
- if the cs_size value of the field 177 is smaller than the maximum slice size value MAX_W_FEED (previously defined as w_size*ABR_CT_SIZE), step 670 is executed: padding data are transferred to the packet payload buffer, ultimately to reach MAX_W_FEED, and the cs_size value is correspondingly incremented;
- if the cs_size value of field 177 reaches the value MAX_W_FEED, at step 669, the transmission of a new compressed slice starts by identifying first compressed tile data to transmit for the first compressed tile of the new slice. Then step 665 is executed for actual data transmission.

The location of padding data in the overall compressed video stream depends on the actual value of w_size, which might be adjusted by the rate control module (step 505) in such a way that w_size is smaller than the value MAX_W_SIZE. Thus it minimizes the quantity of inserted padding data in the overall compressed video stream.

As it is clear from the description above, padding data insertion is controlled to better spread data bursts and avoids transmission buffer underflow or overflow.

The examples described above are only possible embodiments of the invention, which is not limited thereto.

APPENDIX

| | | | | | | |
|---|---|---|---|---|---|---|
| | | | Video settings | | | |
| 1 | Frame_size | (a) | Frame size | 1080 | lines | V_PARAM_1 |
| 2 | Refresh_rate | (b) | Video refresh rate | 60 | Hz | V_PARAM_2 |
| 3 | PIXEL_per_line | (c) | Number of pixel per line | 1920 | pix/line | (c) = a * 16/9 |
| 4 | Video_bitrate | (d) | Raw video bit rate | 2985.984 | Mbps | (d) = a * c * 24 * b |
| 5 | LINE_cy_duration | (e) | Line cycle duration | 15.43 | μs | (e) = 1/(a * b) |
| | | | CODEC settings | | | |
| 6 | TILE_per_line | (f) | Number of tiles per line (MB size) | 16 | lines | C_PARAM_1 |
| 7 | PBR_CT_SIZE | (g) | maximum size for a compressed tile | 65536 | Bytes | C_PARAM_2 |
| 8 | TILE_cy_duration | (h) | Tile cycle duration | 246.91 | μs | (h) = f * e |
| | | | Network settings | | | |
| 9 | ABR_Tgt | (i) | Target average bit rate | 800 | Mbps | N_PARAM_1 |
| 10 | NW_cy_duration | (j) | Period of the network clock (NW_clk), also representing the time between two consecutive packets | 125 | μs | N_PARAM_2 |
| 11 | compression_rate | (k) | Compression ratio | 3.73248 | | (k) = d/j |
| 12 | NW_pk_payload_size | (l) | Network packet payload size dedicated to compressed data (not including protocol information, error correction redundancy, synchronization information) | 12500 | Bytes | (l) = i * j |
| 13 | ABR_CT_size | (m) | Typical average size for a compressed tile | 24691 | Bytes | (m) = INT(i * h) |
| | | | Latency settings | | | |
| 14 | ENC_latency_Tgt | (n) | Targeted latency at the encoder side | 2 | ms | L_PARAM_1 |
| 15 | MAX_W_SIZE | (o) | Maximum number of tiles per slice | 8 | Tiles | (o) = INT(i * n/m) |
| 16 | ENC_latency | (p) | Actual latency at encoder side | 1.975 | ms | (p) = o * m/i |
| 17 | MAX_W_FEED | (q) | Maximum number of bytes per slice | 197 528 | bytes | (p) = m * o |

The invention claimed is:

1. Method for sending compressed data representing at least part of a digital image, comprising:
   encoding source data representing the part to obtain first compressed data having a first complexity;
   including the first compressed data in a selected one of either a first slice and an empty second slice, wherein the first slice comprises second compressed data representing other parts of the digital image and having a second complexity, and wherein the selection of one of the first slice and the second slice depends on at least the first complexity and the second complexity; and
   sending the slice comprising the first compressed data,
   wherein at least one of the encoding, the including, and the sending is performed by at least one computer processor.

2. Sending method according to claim 1, wherein the source data is encoded according to a coding parameter adapted to influence size of the encoded source data and determined depending on a volume of the second compressed data.

3. Sending method according to claim 2, wherein the coding parameter is a quantization parameter and is determined depending on a size of the second compressed data compared to a predetermined average size associated with the other parts.

4. Sending method according to claim 2 or 3, wherein, if the first compressed data are included in an empty second slice, the first slice is completed by padding data.

5. Sending method according to claim 4, wherein the coding parameter is a quantization parameter and wherein, with respect to a sum of the volume of the second compressed data and an expected volume of an expected remaining number of the other parts, the coding parameter is increased if the sum is greater than a slice budget.

6. Sending method according to claim 1, wherein, if the first compressed data are included in the empty second slice, the first slice is completed by padding data.

7. Sending method according to claim 1, wherein the selection of one of the first slice and the second slice for inclusion therein of the first compressed data is also based on a predetermined maximum number of represented parts per slice.

8. Sending method according to claim 1, wherein the first compressed data is included in the second slice if sizes of the first compressed data and second compressed data exceed a predetermined maximum slice size.

9. Sending method according to claim 1, wherein the selection of one of the first slice and the second slice for inclusion therein of the first compressed data further depends on an amount of compressed data representing at least one part among the other parts.

10. Sending method according to claim 1, wherein the first compressed data is included either in the first slice or in the second slice further depending on a quantization value used for encoding the source data.

11. Sending method according to claim 1, wherein the selection of one of the first slice and the second slice for inclusion therein of the first compressed data further depends on a quality of representation of the source data by the compressed data.

12. Sending method according to claim 1, wherein the first compressed data are encoded according to a first level encoding pass enabling the first compressed data to be obtained within a determined time period, and wherein the method further comprises:
    a second encoding step for generating third compressed data representing the part, according to at least one second level encoding pass; and
    a step of selecting the third compressed data instead of the first compressed data for being included in said including step, on at least one condition, comprising that the third compressed data is obtained within the determined time period.

13. Sending method according to claim 12, further comprising a step of including a further image part in either one of the first slice and the second slice depending on at least a size of the third compressed data.

14. Computer program stored on computer-readable information storage means and comprising instructions for carrying out each step of the method according to claim 1 when the program is loaded and executed by a programmable apparatus.

15. Computer-readable information storage means readable by a computer or a microprocessor and storing computer program instructions for carrying out each step of the method according to claim 1 when the program is loaded and executed by a programmable apparatus.

16. Sending method according to claim 1, wherein the sending method is performed by one or more processors executing stored computer program instructions.

17. Device for sending compressed data representing at least part of a digital image, comprising:
    means for encoding source data representing the part into first compressed data having a first complexity;
    means for including the first compressed data in a selected one of either a first slice and an empty second slice, wherein the first slice comprises second compressed data representing other parts of the digital image and having a second complexity, and wherein the selection of one of the first slice and the second slice depends on at least the first complexity and the second complexity; and
    means for sending the slice comprising the first compressed data.

* * * * *